(12) United States Patent
Landis et al.

(10) Patent No.: US 11,678,317 B2
(45) Date of Patent: Jun. 13, 2023

(54) SUBBAND-BASED MEASUREMENT REPORTING

(71) Applicant: QUALCOMM Incorporated, San Diego, CA (US)

(72) Inventors: Shay Landis, Hod Hasharon (IL); Yehonatan Dallal, Kfar Saba (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/184,302

(22) Filed: Feb. 24, 2021

(65) Prior Publication Data
US 2022/0272680 A1   Aug. 25, 2022

(51) Int. Cl.
| | | |
|---|---|---|
| H04L 12/26 | (2006.01) | |
| H04W 72/044 | (2023.01) | |
| H04W 24/10 | (2009.01) | |
| H04W 72/02 | (2009.01) | |
| H04W 72/541 | (2023.01) | |
| H04W 88/02 | (2009.01) | |

(52) U.S. Cl.
CPC ......... *H04W 72/046* (2013.01); *H04W 24/10* (2013.01); *H04W 72/02* (2013.01); *H04W 72/541* (2023.01); *H04W 88/02* (2013.01)

(58) Field of Classification Search
CPC ... H04W 72/046; H04W 24/10; H04W 72/02; H04W 72/082; H04W 88/02
See application file for complete search history.

(56) References Cited

U.S. PATENT DOCUMENTS

| | | | |
|---|---|---|---|
| 2020/0052803 A1* | 2/2020 | Deenoo | H04B 17/318 |
| 2022/0015100 A1* | 1/2022 | Yerramalli | H04W 72/046 |
| 2022/0109481 A1* | 4/2022 | Chen | H04B 7/0456 |

FOREIGN PATENT DOCUMENTS

| | | | | |
|---|---|---|---|---|
| CN | 107925473 A | * | 4/2018 | ........... H04B 7/0478 |
| CN | 108810967 A | * | 11/2018 | ............... H04B 7/06 |
| WO | WO-2021067354 A1 | * | 4/2021 | ........ H04W 72/1278 |

* cited by examiner

*Primary Examiner* — Thai D Hoang
(74) *Attorney, Agent, or Firm* — Harrity & Harrity LLP

(57) ABSTRACT

Various aspects of the present disclosure generally relate to wireless communication. In some aspects, a user equipment (UE) may receive, via multiple UE receive beams, one or more reference signals transmitted over a wideband, the wideband including one or more subbands. The UE may transmit a report based at least in part on one or more measurements of the one or more subbands. Numerous other aspects are described.

30 Claims, 10 Drawing Sheets

SUBBAND-BASED MEASUREMENT REPORTING

FIELD OF THE DISCLOSURE

Aspects of the present disclosure generally relate to wireless communication and to techniques and apparatuses for subband-based measurement reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
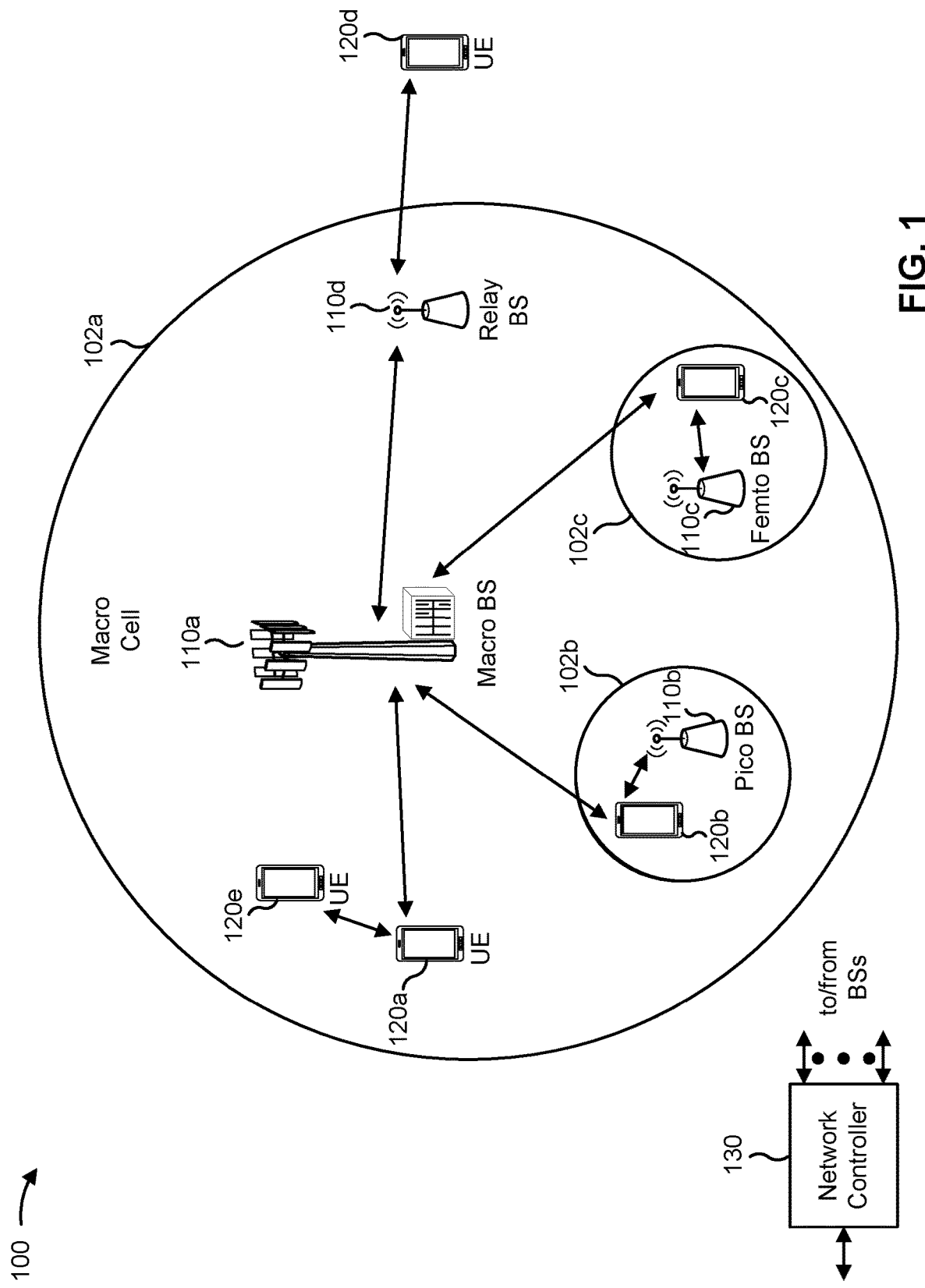
FIG. 1 is a diagram illustrating an example of a wireless network, in accordance with the present disclosure.

In some aspects, a method of wireless communication performed by a UE includes receiving, via multiple UE receive beams, one or more reference signals transmitted over a wideband, the wideband including one or more subbands; and transmitting a report based at least in part on one or more measurements of the one or more subbands.

In some aspects, a method of wireless communication performed by a base station includes transmitting, to a UE for reception via multiple UE receive beams, one or more reference signals transmitted over a wideband, the wideband including one or more subbands; and receiving, from the UE, a report based at least in part on one or more measurements of the one or more subbands.

In some aspects, a UE for wireless communication includes a memory; and one or more processors operatively coupled to the memory, the memory and the one or more processors configured to: receive, via multiple UE receive beams, one or more reference signals transmitted over a wideband, the wideband including one or more subbands; and transmit a report based at least in part on one or more measurements of the one or more subbands.

In some aspects, a base station for wireless communication includes a memory; and one or more processors operatively coupled to the memory, the memory and the one or more processors configured to: transmit, to a UE for reception via multiple UE receive beams, one or more reference signals transmitted over a wideband, the wideband including one or more subbands; and receive, from the UE, a report based at least in part on one or more measurements of the one or more subbands.

In some aspects, a non-transitory computer-readable medium storing a set of instructions for wireless communication includes one or more instructions that, when executed by one or more processors of a UE, cause the UE to: receive, via multiple UE receive beams, one or more reference signals transmitted over a wideband, the wideband including one or more subbands; and transmit a report based at least in part on one or more measurements of the one or more subbands.

In some aspects, a non-transitory computer-readable medium storing a set of instructions for wireless communication includes one or more instructions that, when executed by one or more processors of a base station, cause the base station to: transmit, to a UE for reception via multiple UE receive beams, one or more reference signals transmitted over a wideband, the wideband including one or more subbands; and receive, from the UE, a report based at least in part on one or more measurements of the one or more subbands.

In some aspects, an apparatus for wireless communication includes means for receiving, via multiple UE receive beams, one or more reference signals transmitted over a wideband, the wideband including one or more subbands; and means for transmitting a report based at least in part on one or more measurements of the one or more subbands.

In some aspects, an apparatus for wireless communication includes means for transmitting, to a UE for reception via multiple UE receive beams, one or more reference signals transmitted over a wideband, the wideband including one or more subbands; and means for receiving, from the UE, a report based at least in part on one or more measurements of the one or more subbands.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges, as well as being applicable to other frequency ranges, such as those greater than FR2.

As indicated above, FIG. 1 is provided as an example. Other examples may differ from what is described with regard to FIG. 1.

Figure 2:
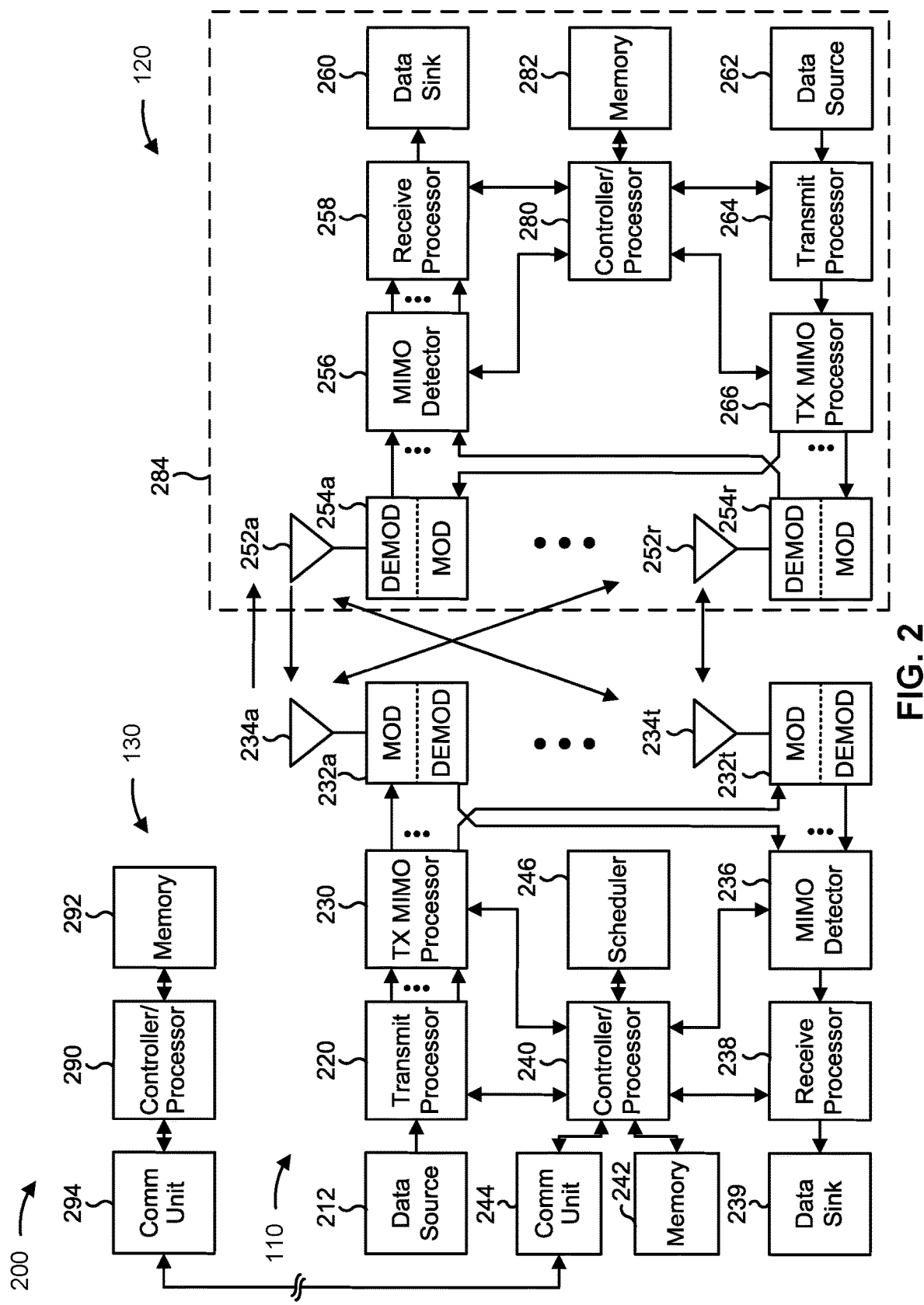
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with subband-based measurement reporting, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE includes means for receiving, via multiple UE receive beams, one or more reference signals transmitted over a wideband, the wideband including one or more subbands; or means for transmitting a report based at least in part on one or more measurements of the one or more subbands. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication to transmit the report based at least in part on the measurements of the one or more subbands.

In some aspects, the UE includes means for measuring the one or more reference signals simultaneously using the multiple UE receive beams, or means for measuring the one or more reference signals sequentially using the multiple UE receive beams.

In some aspects, a base station includes means for transmitting, to a UE for reception via multiple UE receive beams, one or more reference signals transmitted over a wideband, the wideband including one or more subbands; or means for receiving, from the UE, a report based at least in part on one or more measurements of the one or more subbands. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting, to the UE, an indication to transmit the report based at least in part on the measurements of the one or more subbands.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
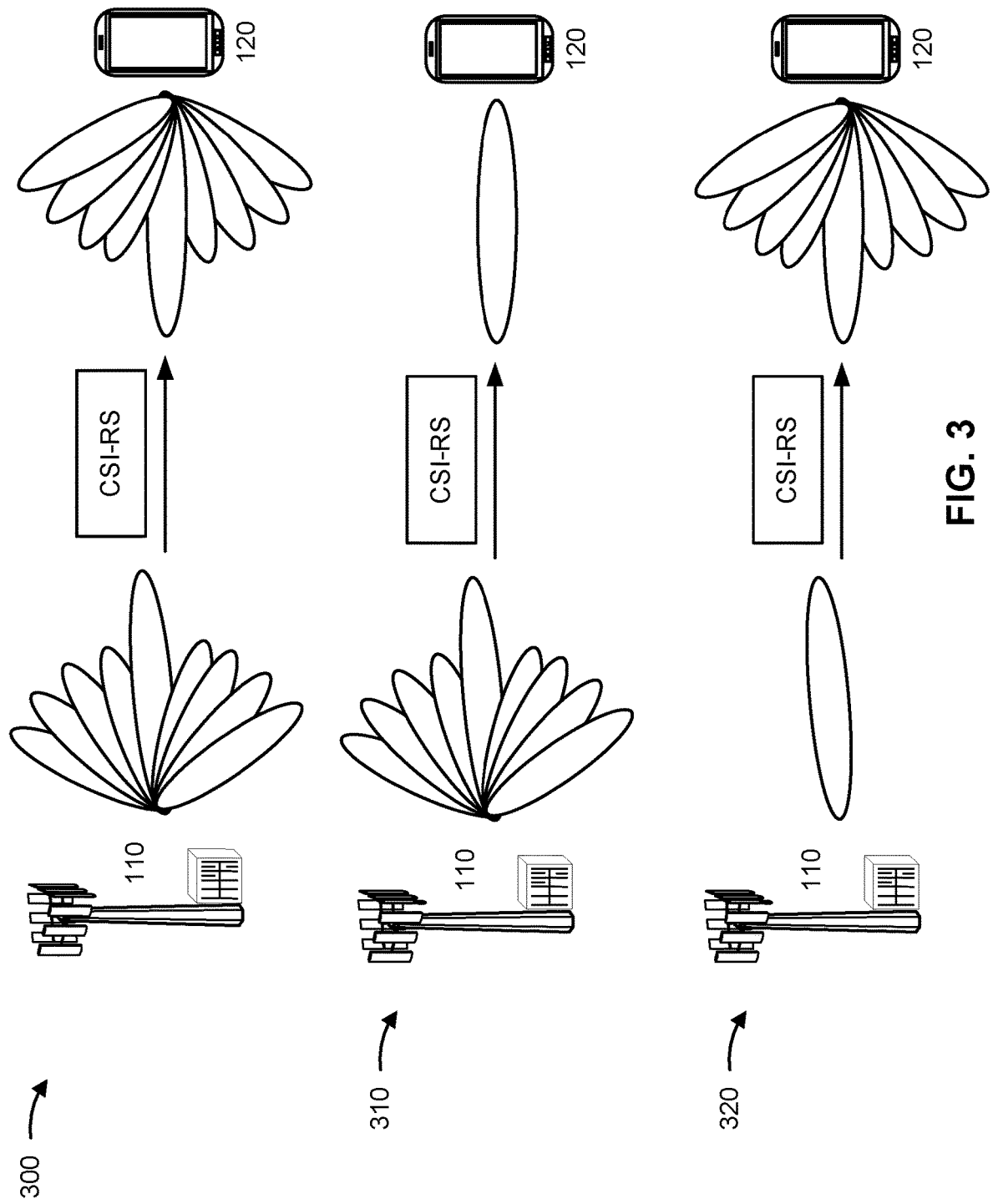
FIG. 3 is a diagram illustrating examples of beam management procedures, in accordance with the present disclosure.

FIG. 3 is a diagram illustrating examples 300, 310, and 320 of beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 3, example 300 may include a base station 110 and a UE 120 communicating to perform beam management (e.g., using channel state information reference signals (CSI-RSs), synchronization signal blocks (SSBs), among other examples). Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use SSBs for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4:
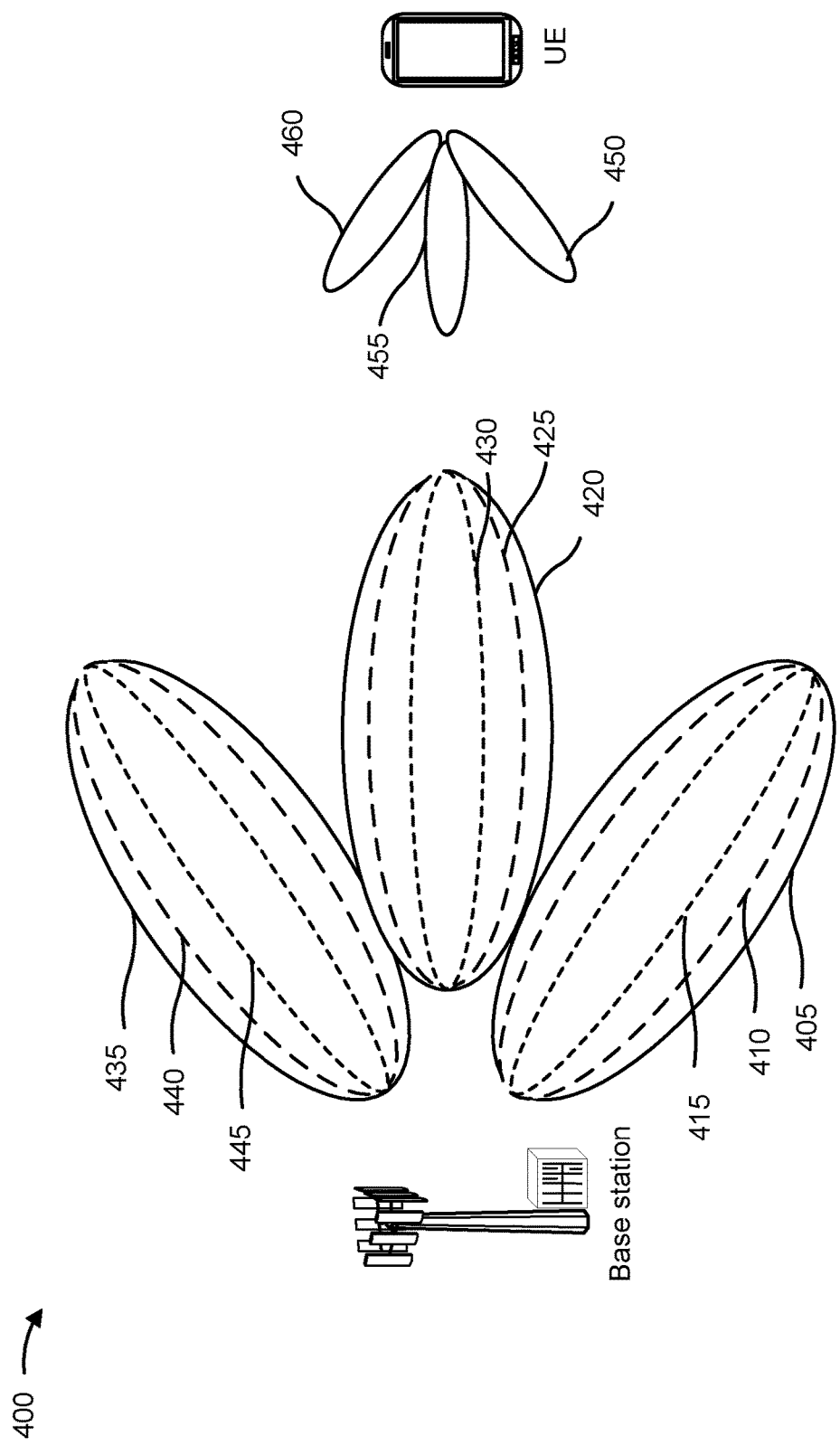
FIG. 4 is a diagram illustrating an example associated with transmissions via beams using a wideband, in accordance with the present disclosure.

FIG. 4 is a diagram illustrating an example 400 associated with transmissions via beams using a wideband, in accordance with the present disclosure. As shown in FIG. 4, a base station may transmit a signal via multiple beams and over a wideband that includes one or more subbands. The subbands may include portions of (e.g., in a frequency domain) the wideband. For example, the base station may transmit a signal via a first base station transmit beam 405 using a wideband. Based at least in part on the base station transmitting the signal via the wideband, a width of the beam 405 may be relatively large. However, subbands of the wideband may carry the signal via a portion of the beam 405 that is narrower than the beam 405. For example, a first subband of the wideband signal may be carried on a portion 410 of the beam 405, and a second subband of the wideband signal may be carried on a portion 415 of the beam 405. Similarly, the base station may transmit a signal via a second base station transmit beam 420 using the wideband. A first subband of the wideband signal may be carried on a portion 425 of the beam 420, and a second subband of the wideband signal may be carried on a portion 430 of the beam 420. Similarly, the base station may transmit a signal via a third base station transmit beam 435 using the wideband. A first subband of the wideband signal may be carried on a portion 440 of the beam 435, and a second subband of the wideband signal may be carried on a portion 445 of the beam 435. Each subband may be associated with a frequency bandwidth within a total frequency bandwidth of the wideband.

The UE may receive the signal via multiple UE receive beams, such as a first UE receive beam 450, a second UE receive beam 455, and/or a third receive beam 460. The UE may also measure various metrics of the received signal, such as RSRP, for each of the UE receive beams. The measurements may be reported back to the base station and may be used, by the base station and/or the UE, to determine interference between receive beams. The base station may perform a beam management procedure (e.g., as described with reference to FIG. 3) based at least in part on the measurements, such as selection of beam pair links (BPLs) for spatial division multiplexing (SDM) transmissions.

At high bandwidths (e.g., FR2 and higher, including FR4 and FR5), transmit beams may experience frequency-dependent changes in the beams. For example, in phased arrays, squinting may occur, which may result in inconsistent steering of the beam direction at different frequencies (e.g., as a function of frequency, polarization, or orientation). In some situations, the frequency-dependent changes may cause interference between beams transmitted using a wideband. For example, beams may overlap (e.g., interfere) when measuring the signal over the wideband. In this situation, a UE may measure the interference between beams using the wideband, and the measurements may be used in a beam selection process to determine BPLs. When interference is detected using the wideband, corresponding beams may not be selected for SDM, despite the interference being a result of squint or other frequency-dependent changes to the beams. In this situation, subbands of the wideband, which might otherwise be suitable for SDM, may not be selected for SDM because of the interference detected in connection with the wideband.

As indicated above, FIG. 4 is provided as an example. Other examples may differ from what is described with regard to FIG. 4.

In some aspects described herein, a base station may transmit a reference signal over a wideband via multiple transmit beams, and a UE may receive the reference signal via multiple receive beams. The wideband over which the signal is transmitted may be divided into one or more subbands (e.g., smaller frequency ranges within the larger wideband frequency range), and the UE may obtain one or more measurements of the reference signal over the one or more subbands (e.g., in addition to measuring the reference signal over the wideband). The one or more subband measurements (e.g., RSRP) may be reported to the base station by the UE and/or used, by the base station and/or the UE, to determine preferred beam pairs for establishing BPLs for subsequent SDM communications. In some situations, the subsequent SDM communications may take place using a subband of the wideband (e.g., in a manner designed to avoid interference at the wideband).

In this way, the base station and the UE may identify subbands, within a wideband (e.g., smaller frequency ranges within a larger wideband frequency range), that can be used for SDM when the associated beams might have otherwise been deemed unsuitable or less desirable for SDM due to wideband interference. This may increase the options and number of beams that can be used for SDM, which may lead to a more efficient use of power, computing, network, and/or communication resources. In addition, the UE's sensitivity to changes in signals during transmission (e.g., squint) may be reduced by using subbands that may have less interference than the wideband in which the subband is included (e.g., for SDM communications).

Figure 5:
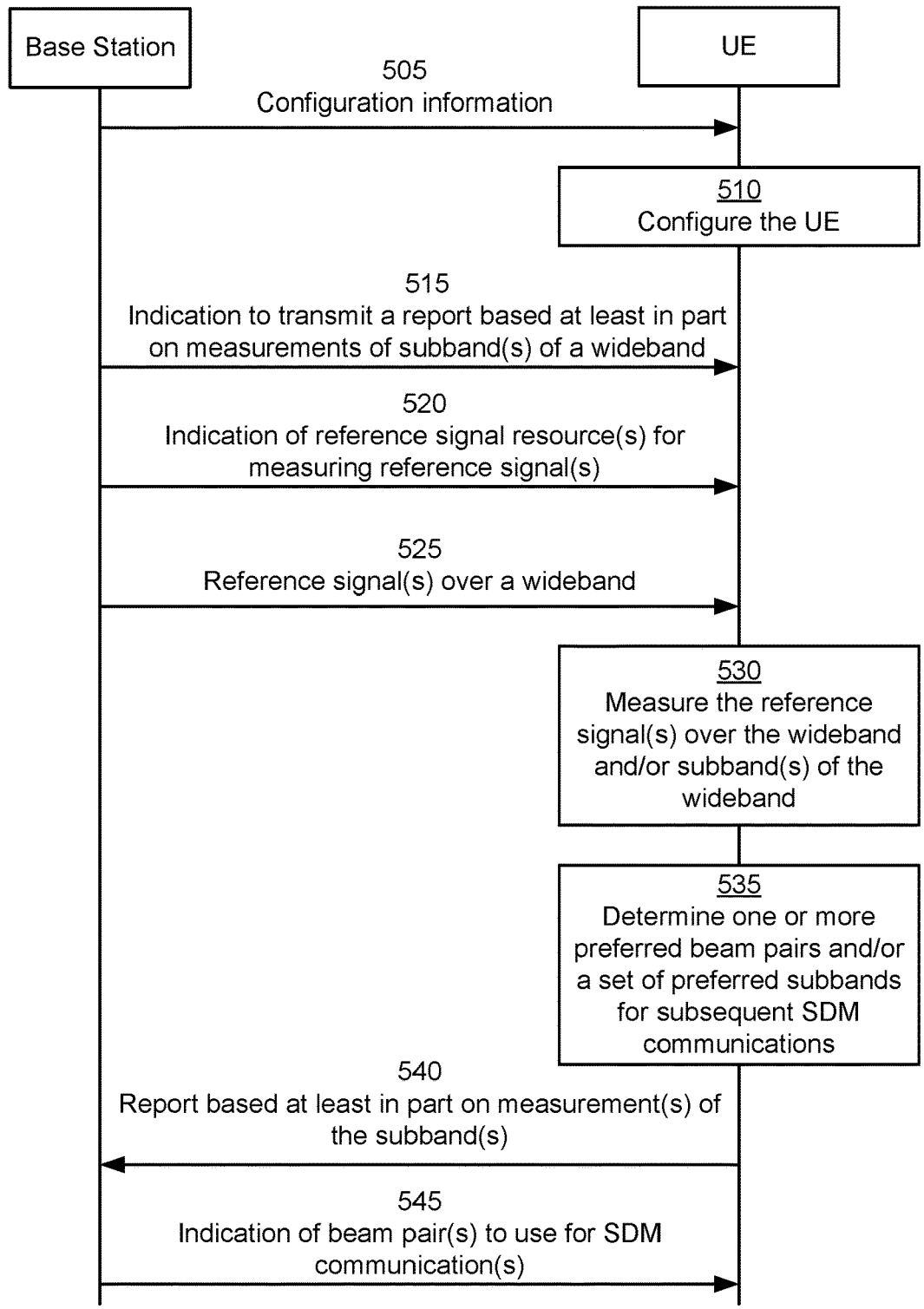
FIGS. 5 and 6 are diagrams illustrating examples associated with subband-based measurement reporting, in accordance with the present disclosure.

FIG. 5 is a diagram illustrating an example 500 associated with subband-based measurement reporting, in accordance with the present disclosure. As shown in FIG. 5, a base station (e.g., base station 110) and a UE (e.g., UE 120) may communicate with one another. The UE and the base station may be part of a wireless network (e.g., wireless network 100). The UE and the base station may communicate using a frequency band that is within FR2 or a higher frequency range (e.g., FR4 or FR5). In some aspects, the UE and the base station may communicate using beamforming. In some aspects, the UE and the base station may be configured to communicate using SDM. In some aspects, the UE may perform a cell search to find a cell provided by the base station. The UE may connect to the base station based at least in part on a random access channel process, among other examples.

As shown by reference number 505, the base station may transmit, and the UE may receive, configuration information. In some aspects, the UE may receive the configuration information via one or more of RRC signaling, MAC control elements (MAC CEs), DCI, and/or the like. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to receive, via multiple receive beams, one or more reference signals transmitted over a wideband. In some aspects the configuration information may indicate that the UE is to measure various properties of one or more reference signals received over a wideband, the measurements being for the wideband and/or one or more subbands of the wideband. In some aspects, the one or more subbands are configured by the base station, and in some aspects, the one or more subbands are configured by the UE. In some aspects, the configuration information may indicate that the UE is to determine (e.g., based on the measurements) one or more preferred beam pairs and/or a set of preferred subbands for subsequent SDM communications. In some aspects the configuration information may indicate that the UE is to transmit a report based at least in part on the measurements of the subbands. In some aspects the configuration information may indicate that the UE is to receive an indication of one or more beam pairs to use for SDM communication.

As shown by reference number 510, the UE may configure itself based at least in part on the configuration information. In some aspects, the UE may be configured to perform one or more operations described herein based at least in part on the configuration information.

As shown by reference number 515, the base station may transmit, and the UE may receive, an indication to transmit a report based at least in part on measurements of one or more subband of a wideband. In some aspects, the indication may be included in the configuration information described in connection with reference number 505. In some aspects, the indication may be included in the indication of the reference signal resource described below in connection with reference number 520.

As shown by reference number 520, the base station may transmit, and the UE may receive, an indication of one or more reference signal resources for measuring one or more reference signals. For example, the base station may indicate one or more resources (e.g., time domain, frequency domain resources, and/or spatial domain resources) in which the UE is to measure one or more reference signals.

As shown by reference number 525, the base station may transmit, and the UE may receive, one or more reference signals over a wideband. For example, the base station may transmit, via multiple transmit beams, and the UE may receive, via multiple receive beams, one or more reference signals over a wideband. The wideband encompasses a frequency range that also includes one or more subbands, which are frequency ranges that are a subset, or portion, of the frequency range of the wideband. In some aspects, the one or more reference signals may include one or more SSBs. Additionally, or alternatively, the one or more reference signals may include one or more CSI-RSs.

As shown by reference number 530, the UE may measure the one or more reference signals over the wideband and/or one or more subbands of the wideband. For example, the UE may measure RSRP, and/or other values, for the reference signal received via multiple UE receive beams. The measurements may be made for the wideband and/or the subbands of the wideband. In some aspects, for each beam, the UE may use parallel receive beam measurements (e.g., using a lens-based antenna, a Butler matrix, among other examples) to generate an RSRP vector for the full wideband and for frequency ranges (e.g., subbands) within the wideband. In some aspects, the UE may generate the vector to include RSRP measurements for all receive beams for reporting to the base station. While the foregoing example uses a vector of RSRP measurements, in some aspects, other measurements may be included in a vector for reporting to the base station and the measurements may be included in another data structure (e.g., an array, list, or table, among other examples).

In some aspects, the UE receive beams may be measured in parallel (e.g., using a Butler matrix) or sequentially. In some aspects, the UE may determine, for each of the subbands, a difference between the measurement of the subbands and the measurement of the wideband (e.g., a delta RSRP value). A delta RSRP value for a subband may indicate a difference between a first RSRP value, measured for that subband, and a second RSRP value measured for a wideband that includes the subband.

In some aspects, the subbands for which the UE measures the one or more reference signals may be configured by the base station (e.g., in configuration information previously provided to the UE). In some aspects, the subbands for which the UE measures the one or more reference signals may be configured by the UE (e.g., dynamically based on the measurements and/or based on previously configured instructions).

As shown by reference number 535, the UE may determine one or more preferred beam pairs and/or a set of preferred subbands for subsequent SDM communications. In some aspects, the set of preferred subbands are based at least in part on a measurement of inter-beam interference, such as interference indicated by the measurements (e.g., RSRP values or delta RSRP values, among other examples) described above in connection with reference number 530. For example, a wideband may include a first subband and a second subband, and the wideband, the first subband, and the second subband may each be associated with a corresponding measurement (e.g., a corresponding RSRP value and/or a corresponding delta RSRP value, among other examples). The measurements may be used to determine which subband should be included in the set of preferred subbands based at least in part on, for example, identifying a subband associated with a least amount of interference (e.g., signal-to-interference-plus-noise ratio (SINR)) with other beams to include in the set and/or a measured parameter associated with the subband (e.g., RSRP, RSRQ, RSSI, and/or CQI, among other examples). In some aspects, the UE may similarly determine one or more preferred beam pairs based at least in part on, for example, inter-beam interference indicated by the measurements.

In some aspects, the UE may determine the one or more preferred beam pairs and/or a set of preferred subbands based at least in part on one or more parameters received from the base station. The one or more parameters may include a restriction on two or more beams or two or more beam pairs. For example, the base station may indicate the base station is unable to transmit (e.g., simultaneously) using a first beam and a second beam. In some aspects, information indicating the one or more preferred beam pairs and/or the set of preferred subbands for subsequent SDM may be included in a report, such as a report provided by the UE to the base station, as described in further detail below.

As shown by reference number 540, the UE may transmit, and the base station may receive, a report based at least in part on one or more measurements of the one or more subbands. In some aspects, the report may be based at least in part on the one or more measurements (e.g., described above in connection with reference number 530) of the one or more subbands. The report may include a variety of information, including information that may be used by the base station to determine (e.g., identify or select, among other examples) BPLs for SDM communication with the UE. In some aspects, the report may include an indication of a measurement of the wideband and an indication of the one or more measurements of the one or more subbands for respective base station transmit beams as measured via the multiple UE receive beams. For example, the report may include RSRP measurements or delta RSRP measurements (e.g., a difference between the wideband measurement and subband measurements) for the one or more reference signals received via the UE receive beams for both the wideband and the one or more subbands of the wideband. In some aspects, the UE may transmit measurement values for a particular number (e.g., a threshold number) of subbands (e.g., within a wideband). In some aspects, the UE may select subbands to include in the report based at least in part on a measured metric of the reference signal as measured over the subband (e.g., RSRP, RSSI, RSRQ, or CQI, among other examples) and a measured interference with other selected subbands. In some aspects, the UE may select the subbands based at least in part on the UE determining that the selected subbands are most suitable for SDM communication (e.g., based at least in part on the measured metric and/or measured interference) with the base station.

In some aspects, the UE may indicate a range of frequencies associated with the selected subbands. For example, the UE may include (e.g., in the report) an indication of frequency bandwidths associated with the selected subbands. In some aspects, the UE may select the frequency bandwidths from a configured set of candidate frequency bandwidths (e.g., having a configured bandwidth size). In some aspects, the UE may select the frequency bandwidths with a UE-selectable bandwidth size.

In some aspects, the report may include an indication of a set of preferred subbands for subsequent SDM. For example, in a situation where the UE determines the set of preferred subbands (e.g., as described above in connection with reference number 535), the set of preferred subbands may be identified in the report. In some aspects, the report may include an indication of one or more preferred beam pairs for subsequent SDM. For example, in a situation where the UE determines the one or more preferred beam pairs (e.g., as described above in connection with reference number 535), the one or more preferred beam pairs may be identified in the report. In some aspects, the UE may indicate beam pairs or beam pair links for a number (e.g., a threshold number) of subbands (e.g., within a wideband). In some aspects, the UE may be configured with the number of subbands.

As shown by reference number 545, the base station may transmit, and the UE may receive, an indication of one or more beam pairs to use for SDM communications. In some aspects, the base station may determine beam pairs to be used for SDM communications and transmit the indication of the beam pairs to the UE. The base station may determine the one or more beam pairs based at least in part on the report transmitted by the UE and received by the base station. For example, the report may indicate a set of preferred subbands, the base station may select one of the preferred subbands based on the report, and the base station may then select one or more beam pairs based at least in part on the selected preferred subband and send the indication of the selected one or more beam pairs to the UE. Additionally, or alternatively, the base station may determine the one or more beam pairs based at least in part on measurements indicated in the report. For example, the base station may determine the one or more beam pairs based at least in part on the reported metrics associated with the subbands (e.g., RSRP, RSSI, RSRQ, or CQI, among other examples). The base station may determine the one or more beam pairs based at least in part on optimization of interference and signal strength for SDM communication with the UE.

In some aspects, the indication may also identify a subband for the one or more beam pairs. For example, the indication may identify a frequency bandwidth of the subband explicitly or implicitly (e.g., using an indicator associated with a frequency bandwidth already known to the UE). In some aspects the UE may use the indication for subsequent SDM communications via the one or more beam pairs.

As indicated above, FIG. 5 is provided as an example. Other examples may differ from what is described with respect to FIG. 5.

Figure 6:
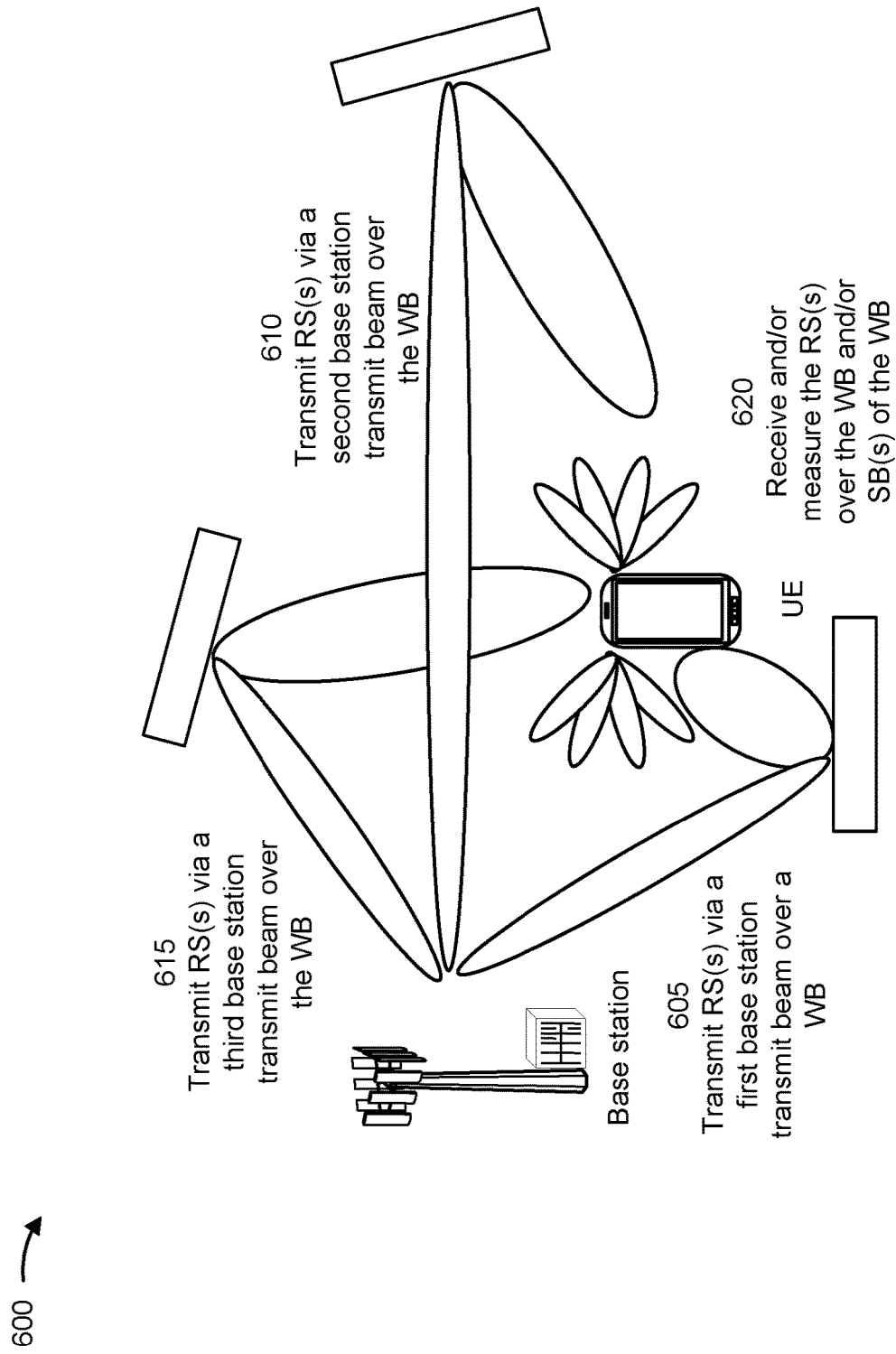

FIG. 6 is a diagram illustrating an example 600 associated with subband-based measurement reporting, in accordance with the present disclosure. As shown in FIG. 6, example 600 includes communication between a base station (e.g., base station 110) and a UE (e.g., UE 120). In some aspects, the base station and the UE may be included in a wireless network, such as wireless network 100. The base station and the UE may communicate via a wireless access link, which may include an uplink and a downlink.

As shown by reference number 605, the base station may transmit one or more reference signals via a first base station transmit beam (e.g., using a wideband). As shown by reference number 610, the base station may transmit one or more reference signals via a second base station transmit beam (e.g., using a wideband). As shown by reference number 615, the base station may transmit one or more reference signals via a third base station transmit beam (e.g., using a wideband). These transmissions may have a wideband frequency bandwidth (e.g., a 10 GHz frequency bandwidth or a 5 GHz frequency bandwidth, among other examples) and/or may be at a relatively high frequency range (e.g., greater than FR1 or greater than FR2, among other examples).

The wideband may include one or more subbands having a relatively narrow frequency bandwidth (e.g., a 2 GHz frequency bandwidth or a 5 GHz frequency bandwidth, among other examples). In some aspects, the one or more subbands may have a frequency bandwidth that is based at least in part on the frequency bandwidth of the wideband. For example, the one or more subbands may have a frequency bandwidth that is a fraction (e.g., ¾, ½, or ¼ of the frequency bandwidth of the wideband). In some aspects, the one or more subbands may have a frequency bandwidth that is centered on a center frequency of the frequency bandwidth of the wideband or that is offset from the center frequency of the frequency bandwidth of the wideband.

As shown by reference number 620, the UE may receive and/or measure the one or more reference signals over the wideband and/or the one or more subbands of the wideband. For example, the UE is depicted as using eight UE receive beams and, for each of the eight UE receive beams, the UE may determine various measurements of the reference signal. By way of example, the UE may measure (e.g., via each of the eight UE receive beams) RSRP of the reference signals for the wideband as well as the RSRP of the reference signals for each subband.

In some aspects, the UE may determine, based on the measurements, one or more preferred beam pairs (e.g., a combination of a base station transmit beam and a UE receive beam with preferred measurements, such as measurements indicating relatively low interference at the wideband or subband) and/or a set of preferred subbands (e.g., subbands with relatively low interference and/or a relatively high signal strength). In some aspects, the UE may transmit a report to the base station based at least in part on the measurements. The report may include data indicating at least one of the measurements (e.g., RSRP values included in a vector generated by the UE), data indicating one or more preferred beam pairs, and/or data indicating preferred subbands, among other examples. The base station may use the report to identify a beam pair for SDM, which may include identifying a beam pair that will utilize a subband for SDM communications.

In this way, the base station and the UE may identify subbands, within a wideband, that may be used for SDM when the associated beams might have otherwise been deemed unsuitable or less desirable for SDM due to wideband interference. This may increase the options and number of beams that can be used for SDM, which may lead to a more efficient use of power, computing, network, and/or communication resources. In addition, sensitivity of the UE to changes in signals during transmission (e.g., squint) may be reduced by using subbands that may have less interference than the wideband in which the subband is included, such as for SDM communications.

As indicated above, FIG. 6 is provided as an example. Other examples may differ from what is described with respect to FIG. 6.

Figure 7:
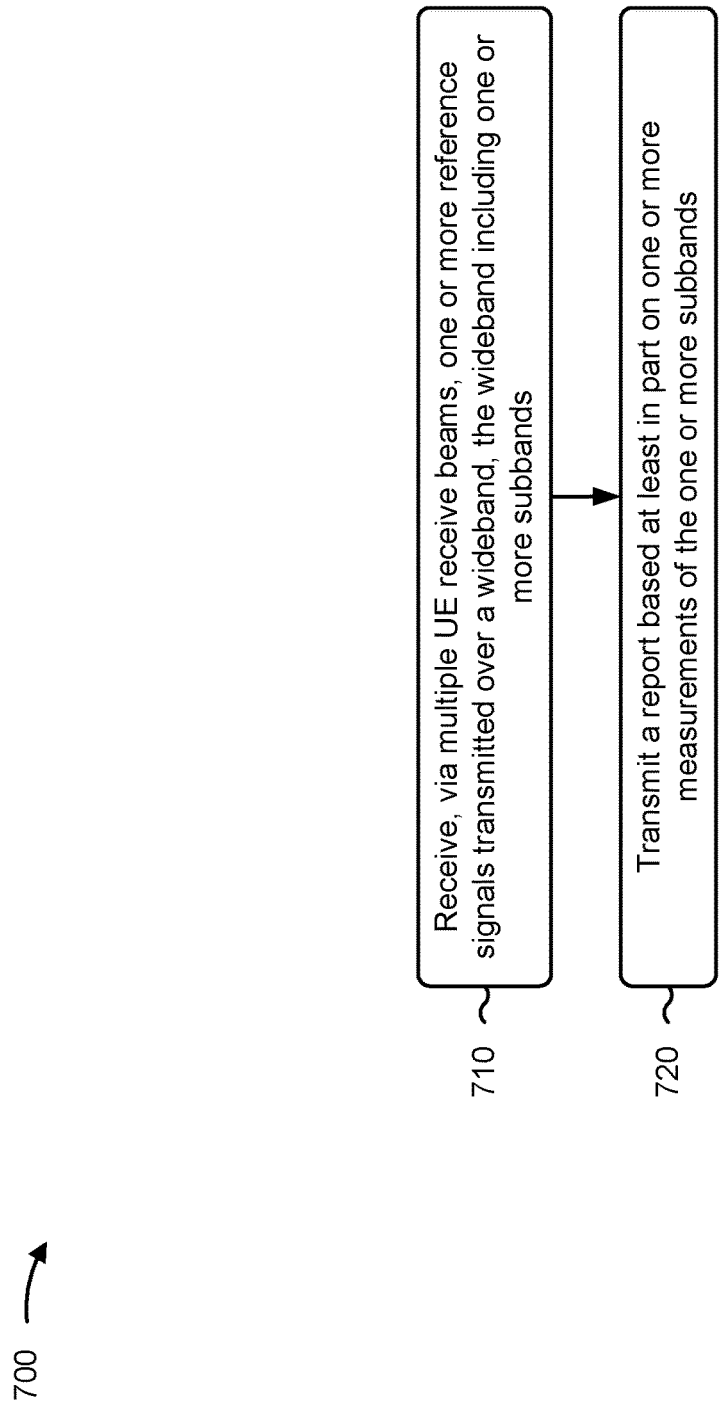
FIGS. 7 and 8 are diagrams illustrating example processes associated with subband-based measurement reporting, in accordance with the present disclosure.

FIG. 7 is a diagram illustrating an example process 700 performed, for example, by an UE, in accordance with the present disclosure. Example process 700 is an example where the UE (e.g., UE 120) performs operations associated with subband-based measurement reporting.

As shown in FIG. 7, in some aspects, process 700 may include receiving, via multiple UE receive beams, one or more reference signals transmitted over a wideband, the wideband including one or more subbands (block 710). For example, the UE (e.g., using reception component 902, depicted in FIG. 9) may receive, via multiple UE receive beams, one or more reference signals transmitted over a wideband, the wideband including one or more subbands, as described above.

As further shown in FIG. 7, in some aspects, process 700 may include transmitting a report based at least in part on one or more measurements of the one or more subbands (block 720). For example, the UE (e.g., using transmission component 904, depicted in FIG. 9) may transmit a report based at least in part on one or more measurements of the one or more subbands, as described above.

Process 700 may include additional aspects, such as any single aspect or any combination of aspects described below and/or in connection with one or more other processes described elsewhere herein.

In a first aspect, process 700 includes receiving an indication to transmit the report based at least in part on the measurements of the one or more subbands.

In a second aspect, alone or in combination with the first aspect, the report comprises an indication of a measurement of the wideband and an indication of the one or more measurements of the one or more subbands.

In a third aspect, alone or in combination with one or more of the first and second aspects, the indication of the one or more measurements of the one or more subbands comprises an indication of a difference from the measurement of the wideband.

In a fourth aspect, alone or in combination with one or more of the first through third aspects, the report comprises an indication of a set of preferred subbands for subsequent spatial division multiplexing communications.

In a fifth aspect, alone or in combination with one or more of the first through fourth aspects, the set of preferred subbands are preferred subbands based at least in part on a measurement of inter-beam interference.

In a sixth aspect, alone or in combination with one or more of the first through fifth aspects, the report comprises an indication of one or more preferred beam pairs for subsequent spatial division multiplexing communications.

In a seventh aspect, alone or in combination with one or more of the first through sixth aspects, the one or more preferred beam pairs are based at least in part on one or more parameters received from a base station.

In an eighth aspect, alone or in combination with one or more of the first through seventh aspects, the one or more subbands comprise one or more subbands configured by a base station, or one or more subbands configured by the UE.

In a ninth aspect, alone or in combination with one or more of the first through eighth aspects, receiving the one or more reference signals comprises measuring the one or more reference signals simultaneously using the multiple UE receive beams, or measuring the one or more reference signals sequentially using the multiple UE receive beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
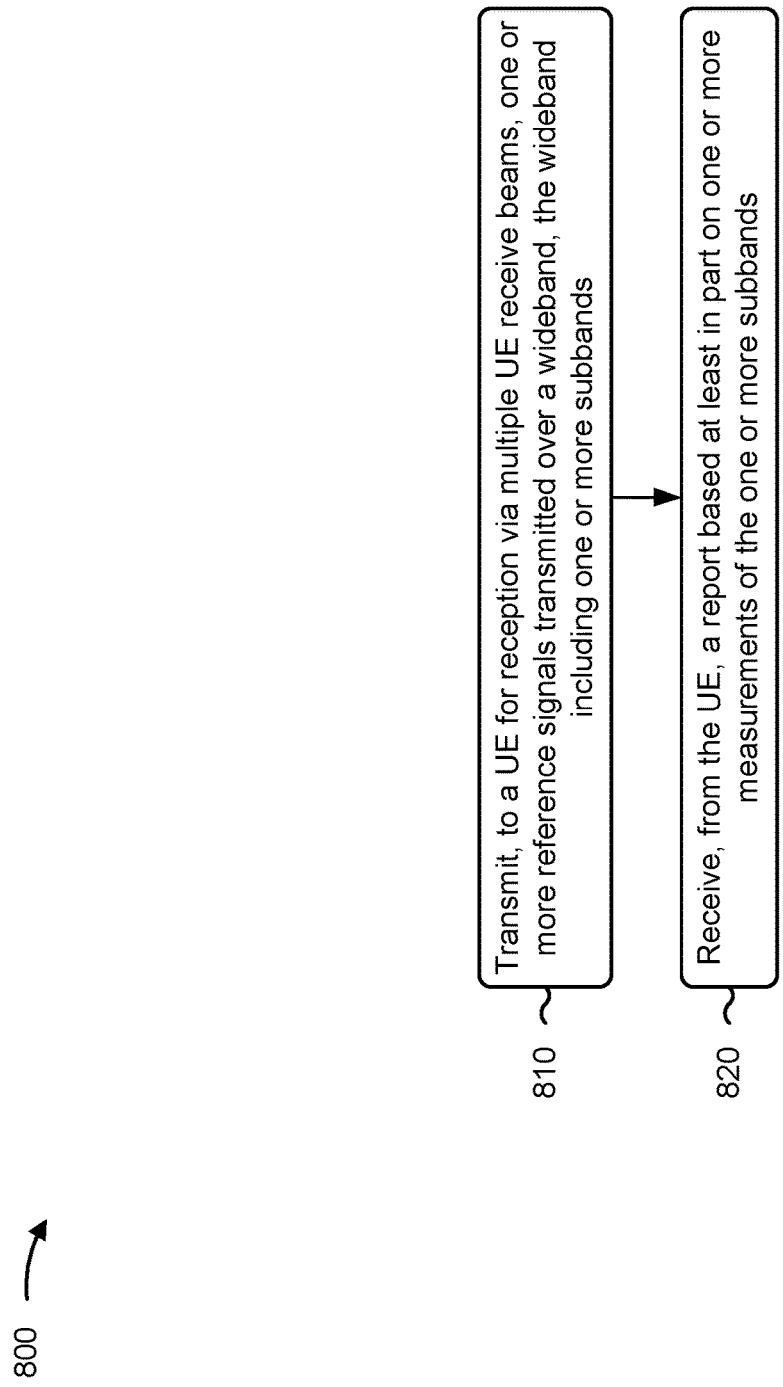

FIG. 8 is a diagram illustrating an example process 800 performed, for example, by a base station, in accordance with the present disclosure. Example process 800 is an example where the base station (e.g., base station 110) performs operations associated with subband-based measurement reporting.

As shown in FIG. 8, in some aspects, process 800 may include transmitting, to a UE for reception via multiple UE receive beams, one or more reference signals transmitted over a wideband, the wideband including one or more subbands (block 810). For example, the base station (e.g., using transmission component 1004, depicted in FIG. 10) may transmit, to a UE for reception via multiple UE receive beams, one or more reference signals transmitted over a wideband, the wideband including one or more subbands, as described above.

As further shown in FIG. 8, in some aspects, process 800 may include receiving, from the UE, a report based at least in part on one or more measurements of the one or more subbands (block 820). For example, the base station (e.g., using reception component 1002, depicted in FIG. 10) may receive, from the UE, a report based at least in part on one or more measurements of the one or more subbands, as described above.

Process 800 may include additional aspects, such as any single aspect or any combination of aspects described below and/or in connection with one or more other processes described elsewhere herein.

In a first aspect, process 800 includes transmitting, to the UE, an indication to transmit the report based at least in part on the measurements of the one or more subbands.

In a second aspect, alone or in combination with the first aspect, the report comprises an indication of a measurement of the wideband and an indication of the one or more measurements of the one or more subbands.

In a third aspect, alone or in combination with one or more of the first and second aspects, the indication of the one or more measurements of the one or more subbands comprises an indication of a difference from the measurement of the wideband.

In a fourth aspect, alone or in combination with one or more of the first through third aspects, the report comprises an indication of a set of preferred subbands for subsequent spatial division multiplexing communications.

In a fifth aspect, alone or in combination with one or more of the first through fourth aspects, the set of preferred subbands are preferred subbands based at least in part on a measurement of inter-beam interference.

In a sixth aspect, alone or in combination with one or more of the first through fifth aspects, the report comprises an indication of one or more preferred beam pairs for subsequent spatial division multiplexing communications.

In a seventh aspect, alone or in combination with one or more of the first through sixth aspects, the one or more preferred beam pairs are based at least in part on one or more parameters received from the base station.

In an eighth aspect, alone or in combination with one or more of the first through seventh aspects, the one or more subbands comprise one or more subbands configured by the base station or one or more subbands configured by the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
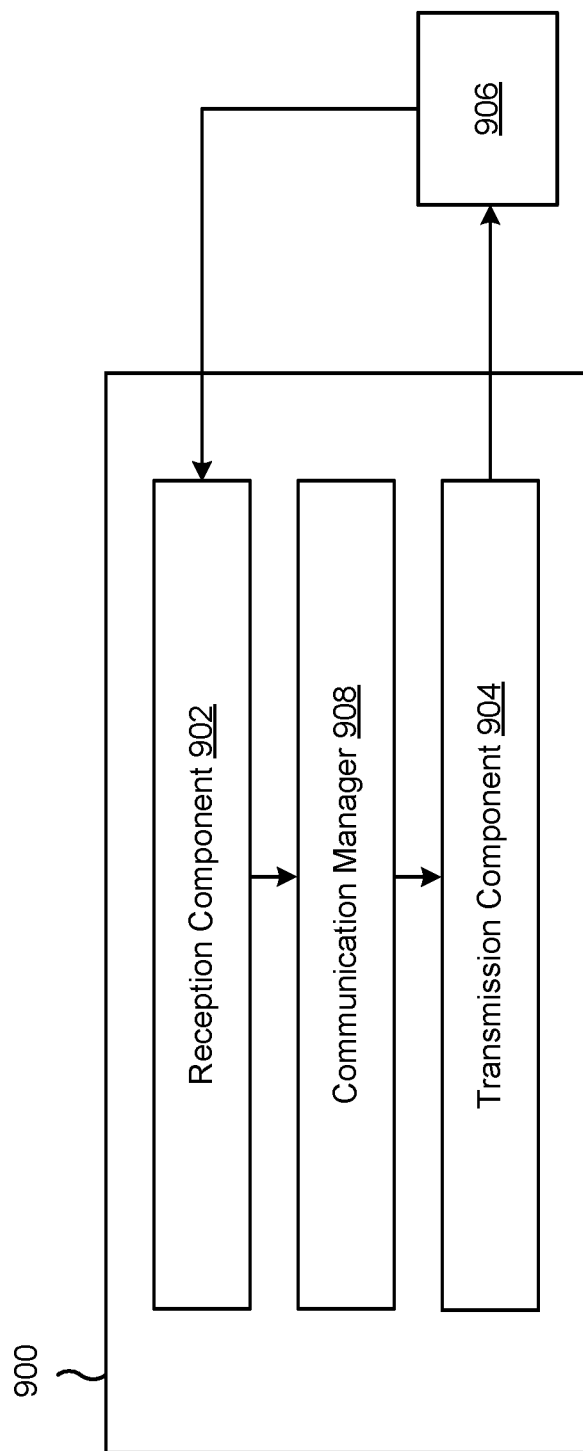
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 configured to perform one or more operations described herein in connection with FIGS. 4-6.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, via multiple UE receive beams, one or more reference signals transmitted over a wideband, the wideband including one or more subbands. The transmission component 904 may transmit a report based at least in part on one or more measurements of the one or more subbands.

The reception component 902 may receive an indication to transmit the report based at least in part on the measurements of the one or more subbands.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
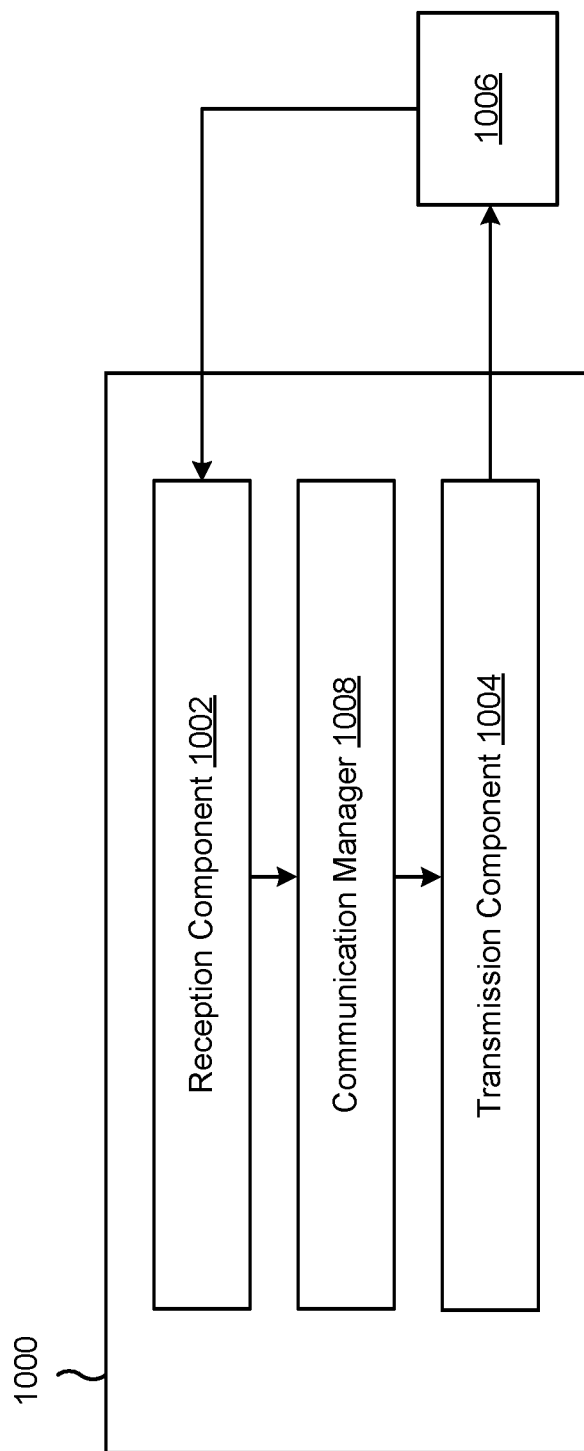

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 configured to perform one or more operations described herein in connection with FIGS. 4-6.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit, to a UE for reception via multiple UE receive beams, one or more reference signals transmitted over a wideband, the wideband including one or more subbands. The reception component 1002 may receive, from the UE, a report based at least in part on one or more measurements of the one or more subbands.

The transmission component 1004 may transmit, to the UE, an indication to transmit the report based at least in part on the measurements of the one or more subbands.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, via multiple UE receive beams, one or more reference signals transmitted over a wideband, the wideband including one or more subbands; and transmitting a report based at least in part on one or more measurements of the one or more subbands.

Aspect 2: The method of Aspect 1, further comprising: receiving an indication to transmit the report based at least in part on the measurements of the one or more subbands.

Aspect 3: The method of any of Aspects 1-2, wherein the report comprises an indication of a measurement of the wideband and an indication of the one or more measurements of the one or more subbands.

Aspect 4: The method of Aspect 3, wherein the indication of the one or more measurements of the one or more subbands comprises an indication of a difference from the measurement of the wideband.

Aspect 5: The method of any of Aspects 1-4, wherein the report comprises an indication of a set of preferred subbands for subsequent spatial division multiplexing communications.

Aspect 6: The method of Aspect 5, wherein the set of preferred subbands are preferred subbands based at least in part on a measurement of inter-beam interference.

Aspect 7: The method of any of Aspects 1-6, wherein the report comprises an indication of one or more preferred beam pairs for subsequent spatial division multiplexing communications.

Aspect 8: The method of Aspect 7, wherein the one or more preferred beam pairs are based at least in part on one or more parameters received from a base station.

Aspect 9: The method of any of Aspects 1-8, wherein the one or more subbands comprise: one or more subbands configured by a base station, or one or more subbands configured by the UE.

Aspect 10: The method of any of Aspects 1-9, wherein receiving the one or more reference signals comprises: measuring the one or more reference signals simultaneously using the multiple UE receive beams, or measuring the one or more reference signals sequentially using the multiple UE receive beams.

Aspect 11: A method of wireless communication performed by a base station, comprising: transmitting, to a UE for reception via multiple UE receive beams, one or more reference signals transmitted over a wideband, the wideband including one or more subbands; and receiving, from the UE, a report based at least in part on one or more measurements of the one or more subbands.

Aspect 12: The method of Aspect 11, further comprising: transmitting, to the UE, an indication to transmit the report based at least in part on the measurements of the one or more subbands.

Aspect 13: The method of any of Aspects 11-12, wherein the report comprises an indication of a measurement of the wideband and an indication of the one or more measurements of the one or more subbands.

Aspect 14: The method of Aspect 13, wherein the indication of the one or more measurements of the one or more subbands comprises an indication of a difference from the measurement of the wideband.

Aspect 15: The method of any of Aspects 11-14, wherein the report comprises an indication of a set of preferred subbands for subsequent spatial division multiplexing communications.

Aspect 16: The method of Aspect 15, wherein the set of preferred subbands are preferred subbands based at least in part on a measurement of inter-beam interference.

Aspect 17: The method of any of Aspects 11-16, wherein the report comprises an indication of one or more preferred beam pairs for subsequent spatial division multiplexing communications.

Aspect 18: The method of Aspect 17, wherein the one or more preferred beam pairs are based at least in part on one or more parameters received from the base station.

Aspect 19: The method of any of Aspects 11-18, wherein the one or more subbands comprise: one or more subbands configured by the base station, or one or more subbands configured by the UE.

Aspect 20: An apparatus for wireless communication at a device, comprising a processor; memory coupled with the processor; and instructions stored in the memory and executable by the processor to cause the apparatus to perform the method of one or more Aspects of Aspects 1-19.

Aspect 21: A device for wireless communication, comprising a memory and one or more processors coupled to the memory, the memory and the one or more processors configured to perform the method of one or more Aspects of Aspects 1-19.

Aspect 22: An apparatus for wireless communication, comprising at least one means for performing the method of one or more Aspects of Aspects 1-19.

Aspect 23: A non-transitory computer-readable medium storing code for wireless communication, the code comprising instructions executable by a processor to perform the method of one or more Aspects of Aspects 1-19.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 1-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, the one or more processors configured to:
        receive, via multiple UE receive beams, one or more reference signals transmitted over a wideband, the wideband including one or more subbands;
        perform one or more measurements of the one or more subbands based at least in part on the one or more reference signals, a set of preferred subbands for subsequent spatial division multiplexing (SDM) communications being determined based at least in part on the one or more measurements; and
        transmit a report based at least in part on the one or more measurements of the one or more subbands, the report comprising an indication of the set of preferred subbands for the subsequent SDM communications.

2. The UE of claim 1, wherein the one or more processors are further configured to:
    receive an indication to transmit the report based at least in part on the one or more measurements of the one or more subbands.

3. The UE of claim 1, wherein the report comprises an indication of a measurement of the wideband and an indication of the one or more measurements of the one or more subbands.

4. The UE of claim 3, wherein the indication of the one or more measurements of the one or more subbands comprises an indication of a difference from the measurement of the wideband.

5. The UE of claim 1, wherein the set of preferred subbands are preferred subbands based at least in part on a measurement of inter-beam interference.

6. The UE of claim 1, wherein the report comprises an indication of one or more preferred beam pairs for the subsequent SDM communications.

7. The UE of claim 6, wherein the one or more preferred beam pairs are based at least in part on one or more parameters received from a base station.

8. The UE of claim 1, wherein the one or more subbands comprise:
    one or more subbands configured by a base station, or
    one or more subbands configured by the UE.

9. The UE of claim 1, wherein the one or more processors, when performing the one or more measurements, are configured to:
    measure the one or more reference signals simultaneously using the multiple UE receive beams, or
    measure the one or more reference signals sequentially using the multiple UE receive beams.

10. A method of wireless communication performed by a user equipment (UE), comprising:
    receiving, via multiple UE receive beams, one or more reference signals transmitted over a wideband, the wideband including one or more subbands;
    performing one or more measurements of the one or more subbands based at least in part on the one or more reference signals, a set of preferred subbands for subsequent spatial division multiplexing (SDM) communications being determined based at least in part on the one or more measurements; and
    transmitting a report based at least in part on the one or more measurements of the one or more subbands, the report comprising an indication of the set of preferred subbands for the subsequent SDM communications.

11. The method of claim 10, further comprising:
    receiving an indication to transmit the report based at least in part on the one or more measurements of the one or more subbands.

12. The method of claim 10, wherein the report comprises an indication of a measurement of the wideband and an indication of the one or more measurements of the one or more subbands.

13. The method of claim 12, wherein the indication of the one or more measurements of the one or more subbands comprises an indication of a difference from the measurement of the wideband.

14. The method of claim 10, wherein the set of preferred subbands are preferred subbands based at least in part on a measurement of inter-beam interference.

15. The method of claim 10, wherein the report comprises an indication of one or more preferred beam pairs for the subsequent SDM communications.

16. The method of claim 15, wherein the one or more preferred beam pairs are based at least in part on one or more parameters received from a base station.

17. The method of claim 10, wherein the one or more subbands comprise:
    one or more subbands configured by a base station, or
    one or more subbands configured by the UE.

18. The method of claim 10, wherein performing the one or more measurements comprises:

measuring the one or more reference signals simultaneously using the multiple UE receive beams, or measuring the one or more reference signals sequentially using the multiple UE receive beams.

19. A non-transitory computer-readable medium storing a set of instructions for wireless communication, the set of instructions comprising:
one or more instructions that, when executed by one or more processors of a user equipment (UE), cause the UE to:
receive, via multiple UE receive beams, one or more reference signals transmitted over a wideband, the wideband including one or more subbands;
perform one or more measurements of the one or more subbands based at least in part on the one or more reference signals, a set of preferred subbands for subsequent spatial division multiplexing (SDM) communications being determined based at least in part on the one or more measurements; and
transmit a report based at least in part on one or more measurements of the one or more subbands, the report comprising an indication of the set of preferred subbands for the subsequent SDM communications.

20. The non-transitory computer-readable medium of claim 19, wherein the one or more instructions further cause the UE to:
receive an indication to transmit the report based at least in part on the one or more measurements of the one or more subbands.

21. The non-transitory computer-readable medium of claim 19, wherein the report comprises an indication of a measurement of the wideband and an indication of the one or more measurements of the one or more subbands.

22. The non-transitory computer-readable medium of claim 21, wherein the indication of the one or more measurements of the one or more subbands comprises an indication of a difference from the measurement of the wideband.

23. The non-transitory computer-readable medium of claim 19, wherein the set of preferred subbands are preferred subbands based at least in part on a measurement of inter-beam interference.

24. The non-transitory computer-readable medium of claim 19, wherein the report comprises an indication of one or more preferred beam pairs for the SDM communications.

25. The non-transitory computer-readable medium of claim 24, wherein the one or more preferred beam pairs are based at least in part on one or more parameters received from a base station.

26. An apparatus for wireless communication, comprising:
means for receiving, via multiple apparatus receive beams, one or more reference signals transmitted over a wideband, the wideband including one or more subbands;
means for performing one or more measurements of the one or more subbands based at least in part on the one or more reference signals, a set of preferred subbands for subsequent spatial division multiplexing (SDM) communications being determined based at least in part on the one or more measurements; and
means for transmitting a report based at least in part on one or more measurements of the one or more subbands, the report comprising an indication of the set of preferred subbands for the subsequent SDM communications.

27. The apparatus of claim 26, further comprising:
means for receiving an indication to transmit the report based at least in part on the one or more measurements of the one or more subbands.

28. The apparatus of claim 26, wherein the report comprises an indication of a measurement of the wideband and an indication of the one or more measurements of the one or more subbands.

29. The apparatus of claim 28, wherein the indication of the one or more measurements of the one or more subbands comprises an indication of a difference from the measurement of the wideband.

30. The apparatus of claim 26, wherein the set of preferred subbands are preferred subbands based at least in part on a measurement of inter-beam interference.

* * * * *